(12) United States Patent
Zhao (10) Patent No.: US 9,949,291 B2
(45) Date of Patent: Apr. 17, 2018

(54) COLLISION PROTECTION BASED ON PACKET ERROR RATE

(71) Applicant: Ruckus Wireless, Inc., Sunnyvale, CA (US)

(72) Inventor: Shiwei Zhao, Union City, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 333 days.

(21) Appl. No.: 14/278,419

(22) Filed: May 15, 2014

(65) Prior Publication Data

US 2015/0334745 A1   Nov. 19, 2015

(51) Int. Cl.
*H04W 74/02* (2009.01)
*H04W 74/06* (2009.01)
*H04W 74/08* (2009.01)

(52) U.S. Cl.
CPC ............ *H04W 74/02* (2013.01); *H04W 74/06* (2013.01); *H04W 74/0816* (2013.01)

(58) Field of Classification Search
None
See application file for complete search history.

(56) References Cited

U.S. PATENT DOCUMENTS

2005/0041616 A1* 2/2005 Ginzburg .............. H04L 1/0021
370/328

OTHER PUBLICATIONS

Murad Abusubaih et al., "Collaborative Setting of RTS/CTS in Multi-Rate Multi-BSS IEEE 802.11 Wireless LANs", Sep. 2008, 2008 16th IEEE Workshop on local and metropolitan area networks, pp. 31-36.*

* cited by examiner

*Primary Examiner* — Adnan Baig
(74) *Attorney, Agent, or Firm* — Steven Stupp (57) ABSTRACT

In order to maintain performance during wireless communication, a transmitting electronic device may selectively enable use of pre-authorization messages during communication with one or more receiving electronic devices. In particular, the transmitting electronic device may monitor a performance metric associated with the communication. If the performance metric is less than a threshold, the transmitting electronic device may selectively enable the use of the pre-authorization messages before communicating data to the one of the receiving electronic devices. Subsequently, the transmitting electronic device monitors a pre-authorization performance metric associated with the communication of the pre-authorization messages. If the pre-authorization performance metric is less than a pre-authorization threshold, the transmitting electronic device may selectively disable the use of the pre-authorization messages. Moreover, if the use of pre-authorization messages is disabled, the transmitting electronic device reverts to monitoring the performance metric.

21 Claims, 5 Drawing Sheets

COLLISION PROTECTION BASED ON PACKET ERROR RATE

BACKGROUND

Field

The described embodiments relate to techniques for adaptively providing collision or contention protection in a wireless network. In particular, the described embodiments relate to techniques for adaptively enabling pre-authorization messages prior to communication in a wireless network based on a packet error rate.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless network.

Figure 1:
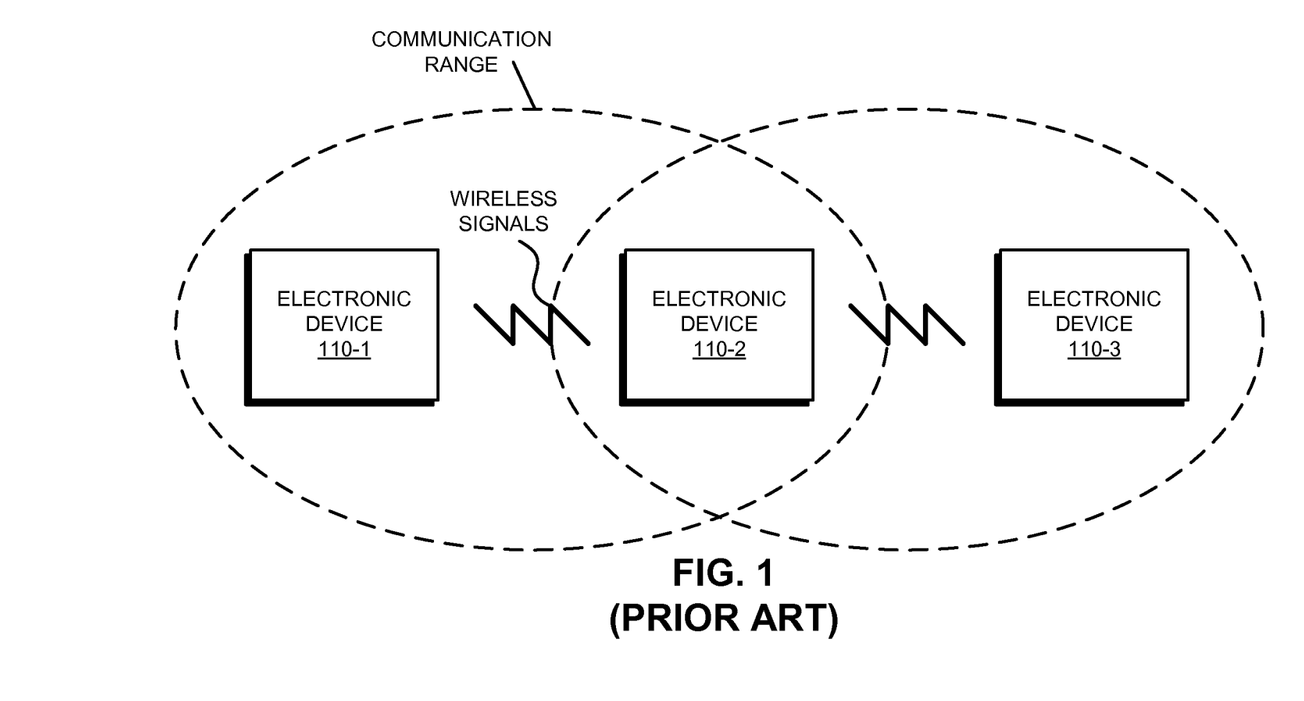
FIG. 1 is a block diagram illustrating electronic devices wirelessly communicating in an existing wireless network.

The performance during wireless communication among electronic devices can vary significantly over time. In principle, providers of the electronic devices and operators of wireless networks can adapt the communication to address changes in performance. For example, as shown in FIG. 1, which provides an illustration of communication among electronic devices 110 in an existing wireless network, electronic device 110-3 may not be within communication range of electronic device 110-1. However, electronic device 110-3 may be within communication range of electronic device 110-2, as is electronic device 110-1. Thus, as far as electronic device 110-1 is concerned, electronic device 110-3 may be a hidden node in the wireless network.

If electronic devices 110-1 and 110-3 concurrently attempt to transmit information to electronic device 110-2, a collision or conflict may occur. The resulting interference may degrade the performance during the wireless communication in the wireless network, and may result in retries and increased latency.

One approach for addressing this problem is to have electronic devices 110-1 and 110-3 transmit pre-authorization messages to electronic device 110-2, and to wait for authorization responses from electronic device 110-2 prior to attempting to transmit information to electronic device 110-2. For example, in the context of Wi-Fi® (from the Wi-Fi Alliance of Austin, Tex.), electronic devices 110-1 and 110-3 may transmit request-to-send messages and may wait to receive clear-to-send messages from electronic device 110-2 prior to transmitting the information to electronic device 110-2. Because electronic device 110-2 is within communication range of electronic devices 110-1 and 110-3, electronic device 110-2 can 'see' both of these electronic devices. Consequently, there is no hidden node as far as electronic device 110-2 is concerned, and the conflict or collision can be avoided.

However, the pre-authorization messages add overhead and, thus, reduce the communication capacity in the wireless network. Consequently, even though they can offer protection from collisions and conflicts, such pre-authorization messages are often not used, which results in variations in communication performance that may degrade the user experience when using electronic devices 110.

SUMMARY

The described embodiments include a transmitting electronic device. This transmitting electronic device includes: an antenna; and an interface circuit, coupled to the antenna, which communicates with one or more receiving electronic devices. During operation, the interface circuit: monitors a performance metric associated with the communication with one of the receiving electronic devices; compares the performance metric to a threshold; and, based on the comparison, selectively enables use of pre-authorization messages before communicating data to the one of the receiving electronic devices, where the pre-authorization message is transmitted to the one or more receiving electronic devices. After enabling the use of the pre-authorization messages, the interface circuit monitors a pre-authorization performance metric associated with the communication of the pre-authorization messages. The interface circuit then: compares the pre-authorization performance metric to a pre-authorization threshold; and selectively disables the use of the pre-authorization messages based on the comparison of the performance metric associated with the communication of the pre-authorization messages to the pre-authorization threshold, where, if the use of the pre-authorization messages is selectively disabled, the interface circuit reverts to monitoring the performance metric.

Note that the performance metric and/or the pre-authorization performance metric may include: an error rate, a throughput and/or a data rate.

Moreover, the pre-authorization messages may include a request-to-send message and/or a clear-to-send message received from the one of the receiving electronic devices.

In some embodiments, prior to selectively enabling the use of the pre-authorization messages, the interface circuit compares a temporal overhead associated with the pre-authorization messages with an additional data-communication time associated with an error rate for communication of data. For example, the additional data-communication time may equal a product of the error rate for the communication and a temporal duration of a data frame divided by one minus the error rate. Furthermore, if the temporal overhead is less than the additional data-communication time, the pre-authorization messages may be selectively enabled. Otherwise, the interface circuit may continue to monitor the performance metric associated with the communication.

Additionally, the transmitting electronic device may include: a processor; and a memory, coupled to the processor, which stores a program module that is executed by the processor. This program module may include instructions for: monitoring the performance metric; comparing the performance metric; selectively enabling the use of the pre-authorization messages; monitoring the pre-authorization performance metric associated with communication of the pre-authorization messages; comparing the pre-authorization performance metric; and selectively disabling the use of the pre-authorization messages.

Moreover, the communication with the one or more receiving electronic devices occurs via a shared medium.

Another embodiment provides a computer-program product for use with the transmitting electronic device. This computer-program product includes instructions for at least some of the operations performed by the transmitting electronic device.

Another embodiment provides a method for selectively enabling use of pre-authorization messages. This method includes at least some of the operations performed by the transmitting electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to maintain performance during wireless communication, a transmitting electronic device (such as an access point) may selectively enable use of pre-authorization messages during communication with one or more receiving electronic devices. In particular, the transmitting electronic device may monitor a performance metric associated with the communication. If the performance metric is less than a threshold, the transmitting electronic device may selectively enable the use of the pre-authorization messages before communicating data to the one of the receiving electronic devices. Subsequently, the transmitting electronic device monitors a pre-authorization performance metric associated with the communication of the pre-authorization messages. If the pre-authorization performance metric is less than a pre-authorization threshold, the transmitting electronic device may selectively disable the use of the pre-authorization messages. Moreover, if the use of pre-authorization messages is disabled, the transmitting electronic device reverts to monitoring the performance metric.

By selectively enabling and/or disabling the use of pre-authorization messages based on monitored performance metrics, this communication technique may allow collisions or conflicts to be prevented as needed. Thus, the communication technique may allow the overhead and capacity impact associated with the pre-authorization messages to be dynamically traded off against the performance during the communication among the transmitting electronic device and the one or more receiving electronic devices. In these ways, the communication technique may maintain the performance while reducing or minimizing the impact on overhead and capacity, thereby improving the overall user experience when using the transmitting electronic device and/or the one or more receiving electronic devices.

In the discussion that follows the transmitting and the receiving electronic devices include radios that communicate packets in accordance with a communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols may be used.

Figure 2:
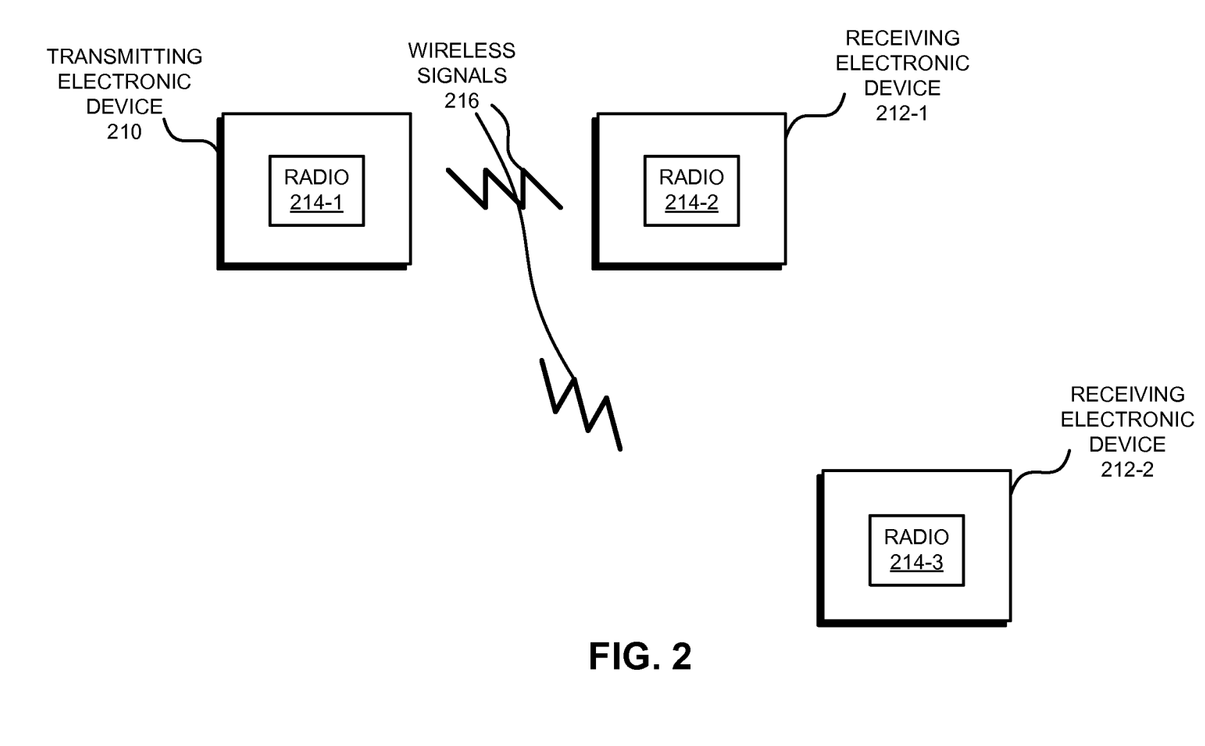
FIG. 2 is a block diagram illustrating electronic devices wirelessly communicating in accordance with embodiments of the present disclosure.

Communication among electronic devices is shown in FIG. 2, which presents a block diagram illustrating transmitting electronic device 210 (such as an access point) and one or more receiving electronic devices 212 (such as portable electronic devices, e.g., cellular telephones) wirelessly communicating. In particular, these electronic devices may wirelessly communicate while: transmitting advertising frames on wireless channels, detecting one another by scanning wireless channels, establishing connections (for example, by transmitting association requests and association responses), and/or transmitting and receiving data packets (which may include additional information as payloads). Note that the communication among transmitting electronic device 210 and the one or more receiving electronic devices 212 may occur via a shared medium, such as a communication channel or link in a wireless network.

Figure 5:
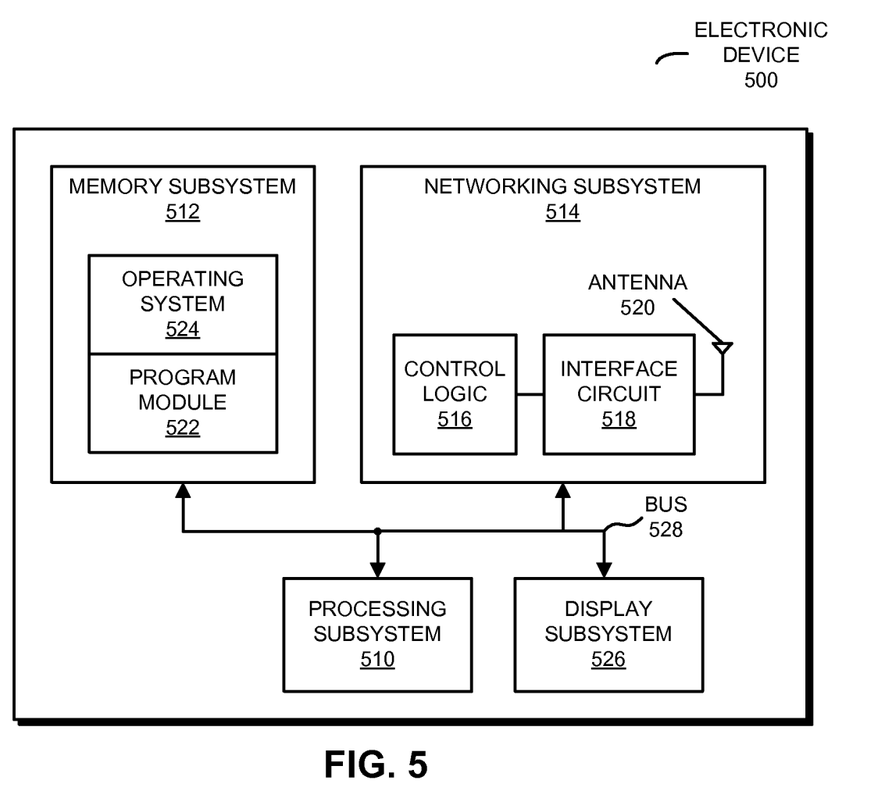
FIG. 5 is a block diagram illustrating one of the electronic devices of FIG. 2 in accordance with embodiments of the present disclosure.

As described further below with reference to FIG. 5, transmitting electronic device 210 and the one or more receiving electronic devices 212 may include subsystems, such as a networking subsystem, a memory subsystem and a processor subsystem. In addition, transmitting electronic device 210 and the one or more receiving electronic devices 212 may include radios 214 in the networking subsystems. More generally, transmitting electronic device 210 and the one or more receiving electronic devices 212 can include (or can be included within) any electronic devices with the networking subsystems that enable transmitting electronic device 210 and the one or more receiving electronic devices 212 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc.

As can be seen in FIG. 2, wireless signals 216 (represented by jagged lines) are transmitted from a radio 214-1 in transmitting electronic device 210. These wireless signals 216 are received by radios 214 in at least one of the one or more receiving electronic devices 212. In particular, transmitting electronic device 210 may transmit packets. In turn, these packets may be received by at least the one of the one or more receiving electronic devices 212. This may allow transmitting electronic device 210 to communicate information to receiving electronic devices 212. Note that the communication between transmitting electronic device 210 and a given one of receiving electronic devices 212 (such as receiving electronic device 212-1) may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). More generally, the performance metric may include a value or a functional relationship indicative of how well the communication is working, which is either measured or determined based on measured information associated with the communication. In some embodiments, the communication between transmitting electronic device 210 and a given one of receiving electronic devices 212 is characterized by an error-rate model, which compares the error rate during communication at the data rate. While receiving electronic devices 212 may receive information from transmitting electronic device 210, note that receiving electronic devices 212 may also transmit information (e.g., to transmitting electronic device 210 and/or one or more of receiving electronic devices 212).

However, a performance during the communication may change. For example, as described previously, there may be collisions or conflicts associated with concurrent communication by transmitting electronic device 210 and receiving electronic device 212-2 with receiving electronic device 212-1. For example, receiving electronic device 212-2 may be a hidden node as far as transmitting electronic device 210 is concerned. The resulting degradation in the performance may increase the number of packets that are resent and, thus, may increase the latency of the communication and may degrade the experience of users of receiving electronic devices 212.

In order to address this problem, transmitting electronic device 210 may implement a communication technique, which is described further below with reference to FIG. 3. In particular, transmitting electronic device 210 may monitor the communication with at least one of receiving electronic devices 212 (such as receiving electronic device 212-1). Based on measurements obtained during the monitoring, transmitting electronic device 210 may directly or indirectly determine a performance metric (such as one of those listed previously). For example, transmitting electronic device 210 may track data rates (which may be specified by interface circuits in transmitting electronic device 210 and/or the one or more receiving electronic devices 212). Alternatively or additionally, transmitting electronic device 210 may determine packet error rates during the communication based on feedback about the communication received from at least the one of receiving electronic devices 212 (such as whether packets were successfully received based on acknowledgment messages). Moreover, in some embodiments transmitting electronic device 210 calculates the performance metric as the ratio of the measured data rate during the communication to an estimated data rate during the communication. Thus, the performance metric may be the utilization, e.g., the ratio of the data rate during successful communication of packets (as indicated by acknowledgment messages) to the estimated data rate of the communication channel or link. Note that the estimated data rate may be the estimated maximum data rate or throughput as determined using the error-rate model for the communication.

Then, transmitting electronic device 210 may compare the performance metric to a threshold. For example, when the performance metric is the data rate or the throughput, the threshold may be a target data rate. Alternatively or additionally, when the performance metric is an error rate (such as a packet error rate), the threshold may be a target packet error rate. This comparison may allow transmitting electronic device 210 to determine that there is another receiving electronic device (in this example, receiving electronic device 212-2) that is communicating with receiving electronic device 212-1 (even though transmitting electronic device 210 may be out of range of direct communication with receiving electronic device 212-2).

Next, transmitting electronic device 210 may selectively enable use of the pre-authorization messages based on the comparison. For example, if the performance metric is less than the threshold (e.g., the data rate is less than the target data rate, the throughput is less than the target throughput and/or the inverse of the packet error rate is less than the inverse of the target packet error rate), transmitting electronic device 210 may selectively enable the use of the pre-authorization messages. Thus, the overhead and loss of capacity associated with the use of pre-authorization messages (which can be as large as 10-30%) may be gated by when this is actually needed, i.e., based on the performance metric. Note that a given pre-authorization message may request authorization to send data to a recipient (such as receiving electronic device 212-1) and may warn a non-recipient (such as receiving electronic device 212-2) of an impending transmission.

In an exemplary embodiment, the pre-authorization messages can include request-to-send (RTS) messages that are transmitted by transmitting electronic device 210 before transmitting electronic device 210 transmits information to or exchange data with receiving electronic device 212-1. Furthermore, transmitting electronic device 210 and/or receiving electronic device 212-2 receive clear-to-send (CTS) messages from receiving electronic devices 212-1 in response to the RTS messages before either of these electronic devices transmits the information to or exchanges data with receiving electronic device 212-1. More generally, the pre-authorization messages may involve the use of a carrier-sense multiple access with collision detection (CSMA/CD) technique. Note that, in response to receiving the CTS from receiving electronic device 212-1, receiving electronic device 212-2 may stop transmitting or communicating with receiving electronic device 212-1 (i.e., the use of RTS-CTS may prevent conflicts or collisions between wireless signals communicated by transmitting electronic device 210 and receiving electronic device 212-2 to receiving electronic device 212-1).

After the use of pre-authorization messages has been enabled, transmitting electronic device 210 may monitor a pre-authorization performance metric (which can include one of the previously described performance metric) that is associated with communication of the pre-authorization messages. Because conflicts or collisions with the wireless signals communicated by receiving electronic device 212-2 may have been prevented, the pre-authorization performance metric may be improved relative to the performance metric prior to the use of the pre-authorization messages. Consequently, after transmitting electronic device 210 compares the pre-authorization performance metric to a pre-authorization threshold, transmitting electronic device 210 may subsequently selectively disable use of the pre-authorization messages based on this second comparison. For example, if the pre-authorization performance metric is less than the pre-authorization threshold, transmitting electronic device 210 may disable the use of the pre-authorization messages. Thus, even after enabling the use of the pre-authorization messages, transmitting electronic device 210 may assess whether their continued use is justified, i.e., based on the pre-authorization performance metric. Note that, if the pre-authorization messages are disabled, transmitting electronic device 210 may revert to monitoring the performance metric (i.e., the communication technique may continue).

In some embodiments, prior to selectively enabling the use of the pre-authorization messages based on the comparison of the performance metric and the threshold, transmitting electronic device 210 compares a temporal overhead associated with the pre-authorization messages with an additional data-communication time associated with an error rate for communication of data. For example, the additional data-communication time may equal a product of the error rate (such as a packet error rate) and a temporal duration of a data frame divided by one minus the error rate. Furthermore, if the temporal overhead is less than the additional data-communication time, the pre-authorization messages may be selectively enabled. Otherwise, the transmitting electronic device 210 may continue to monitor the performance metric.

In the described embodiments, processing a packet or frame in transmitting electronic device 210 and/or the one or more receiving electronic devices 212 includes: receiving wireless signals 216 with the packet or frame; decoding/ extracting the packet or frame from received wireless signals 216 to acquire the packet or frame; and processing the packet or frame to determine information contained in the packet or frame (such as the feedback about the performance during the communication, enabling or disabling the pre-authorization messages, etc.).

Although we describe the network environment shown in FIG. 2 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 3:
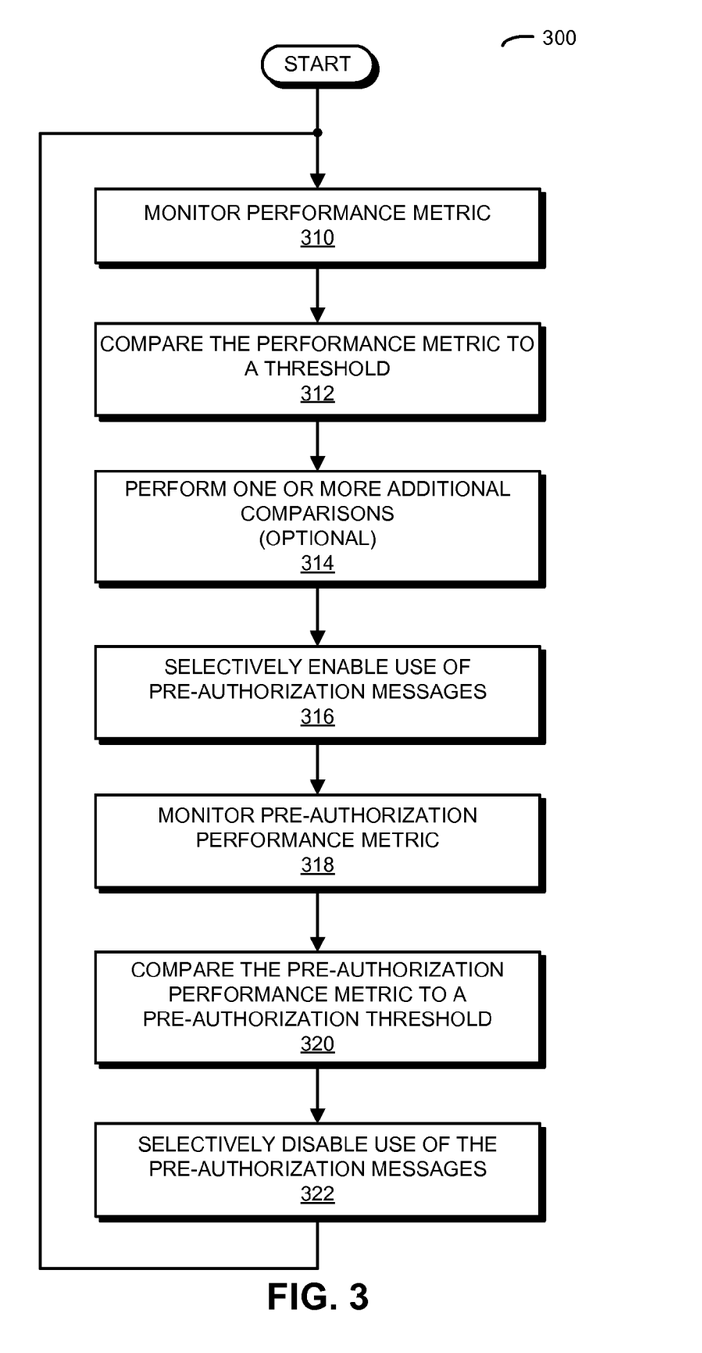
FIG. 3 is a flow diagram illustrating a method for selectively enabling use of pre-authorization messages during communication among the electronic devices in FIG. 2 in accordance with embodiments of the present disclosure.

FIG. 3 presents a flow diagram illustrating method 300 for selectively enabling use of pre-authorization messages that may be performed by a transmitting electronic device, such as transmitting electronic device 210 (FIG. 2). During operation, the transmitting electronic device monitors a performance metric (operation 310) associated with communication with one of the receiving electronic devices. Then, the transmitting electronic device compares the performance metric associated with the communication to a threshold (operation 312). Moreover, based on the comparison (operation 312), the transmitting electronic device selectively enables use of pre-authorization messages (operation 316) before communicating data to the one of the receiving electronic devices, where the pre-authorization message is transmitted to the one or more receiving electronic devices. Next, the transmitting electronic device monitors a pre-authorization performance metric (operation 318) associated with the communication of the pre-authorization messages. Furthermore, the transmitting electronic device compares the pre-authorization performance metric to a pre-authorization threshold (operation 320). Based on the comparison (operation 320), the transmitting electronic device selectively disables the use of the pre-authorization messages (operation 322). If the use of the pre-authorization messages is selectively disabled, the transmitting electronic device reverts to monitoring the performance metric (operation 310).

In these ways, the transmitting electronic device (for example, an interface circuit, a driver and/or software executed in an environment of the transmitting electronic device) may facilitate communication with the one or more receiving electronic devices. In particular, the transmitting electronic device may selectively enable or disable use of the pre-authorization messages based on the monitored performance metrics. This may maintain the performance (such as when there is a hidden node in a wireless network) while reducing or minimizing the adverse impact on the overhead and capacity. Thus, the transmitting electronic device may improve the user experience when communicating with the one or more receiving electronic devices.

In some embodiments of method 300 (FIG. 3), there may be additional or fewer operations. For example, the transmitting electronic device may optionally perform operations 318, 320 and 322. Alternatively or additionally, prior to selectively enabling the use of the pre-authorization messages (operation 316), the transmitting electronic device performs one or more optional additional comparisons (operation 314). In particular, the transmitting electronic device may compare a temporal overhead associated with the pre-authorization messages with an additional data-communication time associated with an error rate for communication of data. In an exemplary embodiment, the additional data-communication time equals a product of the error rate (such as a packet error rate) and a temporal duration of a data frame divided by one minus the error rate. Furthermore, the selective enabling of the pre-authorization messages (operation 316) may be gated by the comparison(s) in operation 314. Thus, if the temporal overhead is less than the additional data-communication time, the pre-authorization messages may be selectively enabled (operation 316). Otherwise, the transmitting electronic device may continue to monitor the performance metric (operation 310).

Additionally, the order of the operations in method 300 may be changed, and/or two or more operations may be combined into a single operation.

In an exemplary embodiment, the pre-authorization messages include RTS and CTS. RTS is a tool designed to provide protection from the hidden-node issue and can also help reduce airtime loss due to collisions. In some wireless networks, RTS is used for all transmission. For example, the wireless network may be associated with a particular provider, vendor or manufacturer of electronic devices. Consequently, such as wireless network is sometimes referred to as a 'wireless system' or a 'wireless-system implementation.') However, RTS also costs airtime overhead whenever it is used, and can reduce the capacity because of the impact on overlapping basic service sets. Consequently, in other wireless networks RTS is never used, even though conflicts and collisions may degrade performance.

This challenge is addressed using the communication technique, which allows real-time adaptation. In particular, RTS may be used intelligently to mitigate collision loss by hidden-node or contentions without incurring un-necessary overhead. Moreover, the communication technique can provide a balance between collision protection and airtime overhead, and can be implemented based on available statistics.

In the communication technique, one or more performance metrics are monitored during communication so that the benefits of enabling RTS versus the cost of airtime overhead are known, so that RTS may be enabled when it is worthwhile. This tradeoff may be determined on the fly, e.g., by a driver in an access point, and the use of RTS may be dynamically or adaptively adjusted for a given station.

For example, RTS may be turned on when the transmit packet error rate is high (such as above a threshold of 20-30%). Typically, the packet error rate may be high when: the signal-to-noise ratio is low, or there is a hidden-node collision or a contention collision. In general, the packet error rate associated with a low signal-to-noise ratio may not be higher than 10-20% if the rate control adapts to use the correct transmit data rate. However, a low transmit data rate may not reduce the packet error rate associated with collisions. In contrast, enabling RTS may help to significantly reduce the airtime cost when collisions happen because RTS has a much shorter frame than data frames.

In order to justify the extra cost of the RTS-CTS exchange, after RTS is turned on it may be useful to know when it can be turned off once the collision problem is resolved. Instead of using the packet error rate of the data frames as the performance metric (because these data frames have now been protected by RTS), the packet error rate of only the RTS frames may be used as the pre-authorization performance metric. Because RTS frames are short and are transmitted at very reliable data rates, RTS failures are most likely due to collisions (or if a station is gone). Consequently, RTS may be turned off if the packet error rate of RTS frames has been very low for a duration (such as several minutes). For example, the pre-authorization threshold for stopping RTS may be 5% or less. Otherwise, RTS may continue to be used.

Because of the overhead of the RTS-CTS exchange, it may not be desirable to apply RTS to each transmission even if the packet error rate is high. For example, assuming that the RTS-CTS exchange has an overhead of 100 ms, then any frames that take less than 100 ms to transmit may not add the RTS no matter how high the packet error rate is. In this example, RTS may only be used (i.e., is worth the overhead) if the product of the transmit time of a frame is greater than 100 ms (the overhead of the RTS-CTS exchange). Thus, if the transmit time for a frame is 5 ms and the packet error rate is 25%, the overhead associated with RTS is worth it and RTS may be used.

Figure 4:
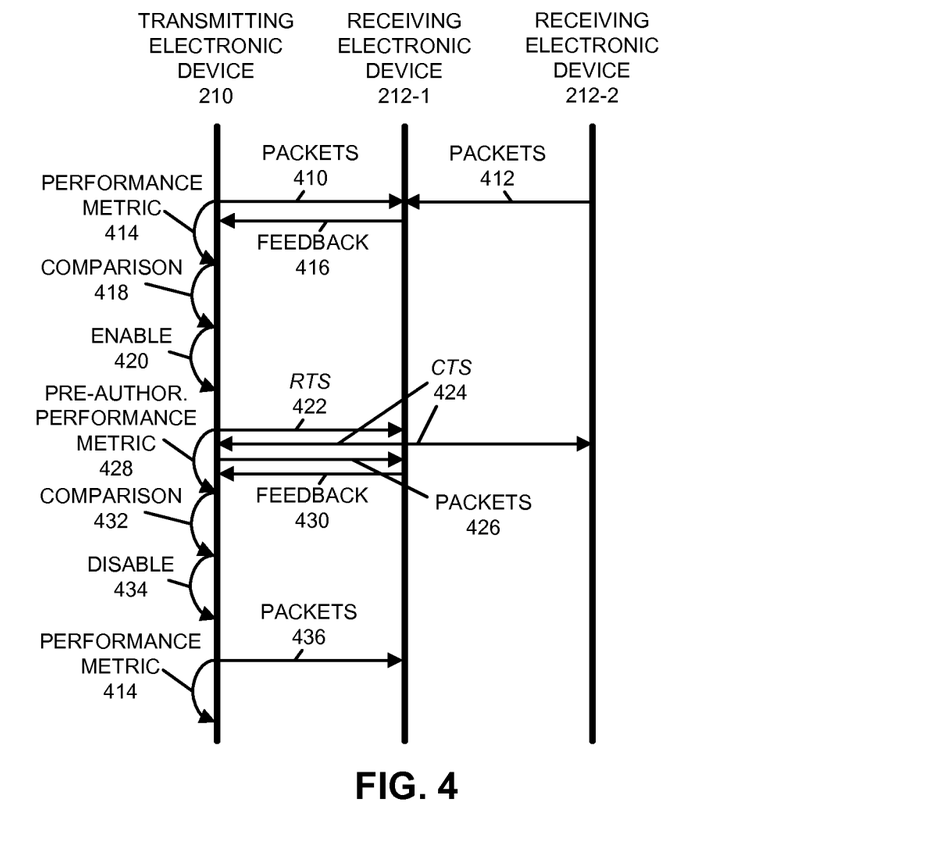
FIG. 4 is a drawing illustrating communication among the electronic devices in FIG. 2 in accordance with embodiments of the present disclosure.

The communication technique is further illustrated in FIG. 4, which presents a drawing illustrating communication among transmitting electronic device 210 and one or more of receiving electronic devices 212 (FIG. 2). In particular, transmitting electronic device 210 may communicate packets 410 with receiving electronic device 212-1, and receiving electronic device 212-2 may communicate packets 412 with receiving electronic device 212-1. During this communication technique, transmitting electronic device 210 may, directly or indirectly (such as via a subsequent calculation), monitor performance metric 414. This monitoring may involve transmitting electronic device 210 receiving feedback 416 about the communication (such as acknowledgment messages) from receiving electronic device 212-1.

Then, transmitting electronic device 210 may compare 418 the performance metric to the threshold. Based on this comparison, transmitting electronic device 210 may selectively enable 420 the use of the pre-authorization messages. Furthermore, before subsequent communication of packets 426 with receiving electronic device 212-1, transmitting electronic device 210 may transmit RTS 422 to receiving electronic device 212-1 and may receive CTS 424 from receiving electronic device 212-1. Note that receiving electronic device 212-2 may also receive CTS 424, which may gate subsequent transmission by receiving electronic device 212-2 (and, thus, may prevent subsequent collisions or conflicts).

During the communication of RTS 422 and/or packets 426, transmitting electronic device 210 may, directly or indirectly (such as via a subsequent calculation), monitor pre-authorization performance metric 428. In addition, transmitting electronic device 210 may receive feedback 430 about the communication (such as acknowledgment messages) from receiving electronic device 212-1.

Then, transmitting electronic device 210 may compare 432 the pre-authorization performance metric to the pre-authorization threshold. Based on this comparison, transmitting electronic device 210 may selectively disable 434 the use of the pre-authorization messages. If the use of the pre-authorization messages is disabled, transmitting electronic device 210 may revert to monitoring performance metric 414 during subsequent communication of packets 436 with receiving electronic device 212-1 (i.e., the communication technique may continue).

We now describe embodiments of the electronic device. FIG. 5 presents a block diagram illustrating an electronic device 500, such as transmitting electronic device 210 or one of receiving electronic devices 212 in FIG. 2. This electronic device includes processing subsystem 510, memory subsystem 512, and networking subsystem 514. Processing subsystem 510 includes one or more devices configured to perform computational operations. For example, processing subsystem 510 can include one or more microprocessors, application-specific integrated circuits (ASICs), microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and an antenna 520. For example, networking subsystem 514 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system. Note that in some embodiments antenna 520 includes multiple antenna elements in an adaptive array that can be selectively turned on and/or off by control logic 516 to create a variety of antenna patterns.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a consumer-electronic device, a portable computing device, a wireless access point, a router, a switch, communication equipment, test equipment, and/or another electronic device.

Although specific components are used to describe electronic device 500, in alternative embodiments, different components and/or subsystems may be present in electronic device 500. For example, electronic device 500 may include one or more additional processing subsystems 510, memory subsystems 512, networking subsystems 514, and/or display subsystems 526. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments, some or all of a given subsystem or component can be integrated into one or more of the other subsystems or component(s) in electronic device 500. For example, in some embodiments program module 522 is included in operating system 524.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 514, such as a radio. Moreover, the integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, monitoring or calculating the performance metric, etc.)

While a communication protocol compatible with Wi-Fi was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 522, operating system 524 (such as a driver for interface circuit 518) or in firmware in interface circuit 518. Alternatively or additionally, at least some of the operations in the communication technique may be implemented in a physical layer, such as hardware in interface circuit 518.

Moreover, while the preceding embodiments illustrated the use of the communication technique and method 200 (FIG. 2) in transmitting electronic device 210 (FIG. 2), in other embodiments the enabling and/or disabling of the use of the pre-authorization messages is performed: system-wide, per radio, per wireless network, per client, etc. Thus, at least some of the operations in the communication technique and method 200 (FIG. 2) may be performed by a remote electronic device or server. For example, the enabling and/or disabling of the use of the pre-authorization messages may be performed system-wide (such as for multiple transmitting electronic devices) by a central server.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A transmitting electronic device, comprising:
an antenna; and
an interface circuit, coupled to the antenna, configured to communicate with a receiving electronic device, wherein the interface circuit is configured to:
communicate with the receiving electronic device;
monitor a performance metric associated with the communication with the receiving electronic device;
compare the performance metric associated with the communication to a threshold;
selectively enable, based on the comparison of the performance metric and the threshold, transmitting of pre-authorization messages to the receiving electronic device before communicating data to the receiving electronic device;
communicate the pre-authorization messages and associated data frames with the receiving electronic device;
monitor a pre-authorization performance metric based on the communication of the pre-authorization messages, wherein the pre-authorization performance metric excludes contributions from the data frames;
compare the pre-authorization performance metric to a pre-authorization threshold; and
selectively disable the use of the pre-authorization messages based on the comparison of the pre-authorization performance metric to the pre-authorization threshold, wherein, if the use of the pre-authorization messages is selectively disabled, the interface circuit reverts to monitoring the performance metric.

2. The transmitting electronic device of claim 1, wherein at least one of the performance metric and the pre-authorization performance metric includes one of: an error rate, a throughput and a data rate.

3. The transmitting electronic device of claim 1, wherein the pre-authorization messages include a request-to-send message; and
wherein the pre-authorization messages include a clear-to-send message received from the receiving electronic device.

4. The transmitting electronic device of claim 1, wherein at least one of the performance metric and the pre-authorization performance metric includes a signal-to-noise ratio.

5. The transmitting electronic device of claim 1, wherein, prior to selectively enabling the use of the pre-authorization messages, the interface circuit is further configured to compare a temporal overhead associated with the pre-authorization messages with an additional data-communication time associated with an error rate for communication of data; and
wherein the pre-authorization messages are selectively enabled if the temporal overhead is less than the additional data-communication time; and
wherein otherwise the interface circuit continues to monitor the performance metric associated with the communication.

6. The transmitting electronic device of claim 5, wherein the additional data-communication time equals a product of the error rate and a temporal duration of a data frame divided by one minus the error rate.

7. The transmitting electronic device of claim 1, wherein the transmitting electronic device further comprises:
a processor; and
a memory, coupled to the processor, which stores a program module configured to be executed by the processor, wherein, when executed by the processor, the program module causes the transmitting electronic device to:
communicate with the receiving electronic device;
monitor the performance metric;
compare the performance metric;
selectively enable the use of the pre-authorization messages;
communicate the pre-authorization messages and the data frames with the receiving electronic device;
monitor the pre-authorization performance metric;
compare the pre-authorization performance metric; and
selectively disable the use of the pre-authorization messages.

8. A non-transitory computer-readable storage medium for use in conjunction with a transmitting electronic device, the non-transitory computer-readable storage medium storing a program module to selectively enable use of pre-authorization messages, wherein, when executed by the transmitting electronic device, the program module causes the transmitting electronic device to:
communicate with a receiving electronic device;
monitor a performance metric associated with communication with the receiving electronic device;
compare the performance metric associated with the communication to a threshold;
selectively enable, based on the comparison of the performance metric and the threshold, transmitting of pre-authorization messages to the receiving electronic device before communicating data to the receiving electronic device;
communicate the pre-authorization messages and associated data frames with the receiving electronic device;
monitor a pre-authorization performance metric based on the communication of the pre-authorization messages, wherein the pre-authorization performance metric excludes contributions from the data frames;
compare the pre-authorization performance metric to a pre-authorization threshold; and
selectively disable the use of the pre-authorization messages based on the comparison of the pre-authorization performance metric to the pre-authorization threshold, wherein, if the use of the pre-authorization messages is selectively disabled, the transmitting electronic device reverts to the monitoring of the performance metric.

9. The computer-readable storage medium of claim 8, wherein at least one of the performance metric and the pre-authorization performance metric includes one of: an error rate, a throughput, a data rate and a combination of at least two of the error rate, the throughput and the data rate.

10. The computer-readable storage medium of claim 8, wherein the pre-authorization messages include a request-to-send message; and
wherein the pre-authorization messages include a clear-to-send message received from the receiving electronic device.

11. The computer-readable storage medium of claim 8, wherein at least one of the performance metric and the pre-authorization performance metric includes a signal-to-noise ratio.

12. The computer-readable storage medium of claim 8, wherein, when executed by the transmitting electronic device, the program module further causes the transmitting electronic device to, prior to the selective enabling of the use of the pre-authorization messages, compare a temporal overhead associated with the pre-authorization messages with an additional data-communication time associated with an error rate for communication of data; and     wherein the pre-authorization messages are selectively enabled if the temporal overhead is less than the additional data-communication time; and     wherein otherwise the transmitting electronic device continues the monitoring of the performance metric associated with the communication.

13. The computer-readable storage medium of claim 12, wherein the additional data-communication time equals a product of the error rate and a temporal duration of a data frame divided by one minus the error rate.

14. A method for selectively enabling use of pre-authorization messages, wherein the method comprises:

communicating with a receiving electronic device;

monitoring a performance metric associated with communication with the receiving electronic device;

comparing the performance metric associated with the communication to a threshold;

selectively enabling, based on the comparison of the performance metric and the threshold, transmitting of pre-authorization messages to the receiving electronic device before communicating data to the receiving electronic device;

communicating the pre-authorization messages and associated data frames with the receiving electronic device;

monitoring a pre-authorization performance metric based on the communication of the pre-authorization messages, wherein the pre-authorization performance metric excludes contributions from the data frames;

comparing the pre-authorization performance metric to a pre-authorization threshold; and     selectively disabling the use of the pre-authorization messages based on the comparison of the pre-authorization performance metric to the pre-authorization threshold, wherein, if the use of the pre-authorization messages is selectively disabled, the method reverts to monitoring the performance metric.

15. The method of claim 14, wherein at least one of the performance metric and the pre-authorization performance metric includes one of: an error rate, a throughput and a data rate.

16. The method of claim 14, wherein the pre-authorization messages include a request-to-send message; and     wherein the pre-authorization messages include a clear-to-send message received from the receiving electronic device.

17. The method of claim 14, wherein at least one of the performance metric and the pre-authorization performance metric includes a signal-to-noise ratio.

18. The method of claim 14, wherein, prior to selectively enabling the use of the pre-authorization messages, the method further comprises comparing a temporal overhead associated with the pre-authorization messages with an additional data-communication time associated with an error rate for communication of data; and     wherein the pre-authorization messages are selectively enabled if the temporal overhead is less than the additional data-communication time; and     wherein otherwise the method continues monitoring the performance metric associated with the communication.

19. An integrated circuit, comprising:

a node configured to couple to an antenna; and an interface circuit, electrically coupled to the node, configured to communicate with a receiving electronic device, wherein the interface circuit is configured to:

communicate with the receiving electronic device;

monitor a performance metric associated with the communication with the receiving electronic device;

compare the performance metric associated with the communication to a threshold;

selectively enable, based on the comparison of the performance metric and the threshold, transmitting of pre-authorization messages to the receiving electronic device before communicating data to the receiving electronic device;

communicate the pre-authorization messages and associated data frames with the receiving electronic device;

monitor a pre-authorization performance metric based on the communication of the pre-authorization messages, wherein the pre-authorization performance metric excludes contributions from the data frames;

compare the pre-authorization performance metric to a pre-authorization threshold; and     selectively disable the use of the pre-authorization messages based on the comparison of the pre-authorization performance metric to the pre-authorization threshold, wherein, if the use of the pre-authorization messages is selectively disabled, the interface circuit reverts to monitoring the performance metric.

20. The integrated circuit of claim 19, wherein at least one of the performance metric and the pre-authorization performance metric includes one of: an error rate, a throughput and a data rate.

21. The integrated circuit of claim 19, wherein the pre-authorization messages include a request-to-send message; and     wherein the pre-authorization messages include a clear-to-send message received from the receiving electronic device.

\* \* \* \* \*